No. 684,348. Patented Oct. 8, 1901.
F. A. BROWNELL.
FOCUSING DEVICE FOR PHOTOGRAPHIC CAMERAS.
(Application filed Feb. 7, 1901.)
(No Model.)
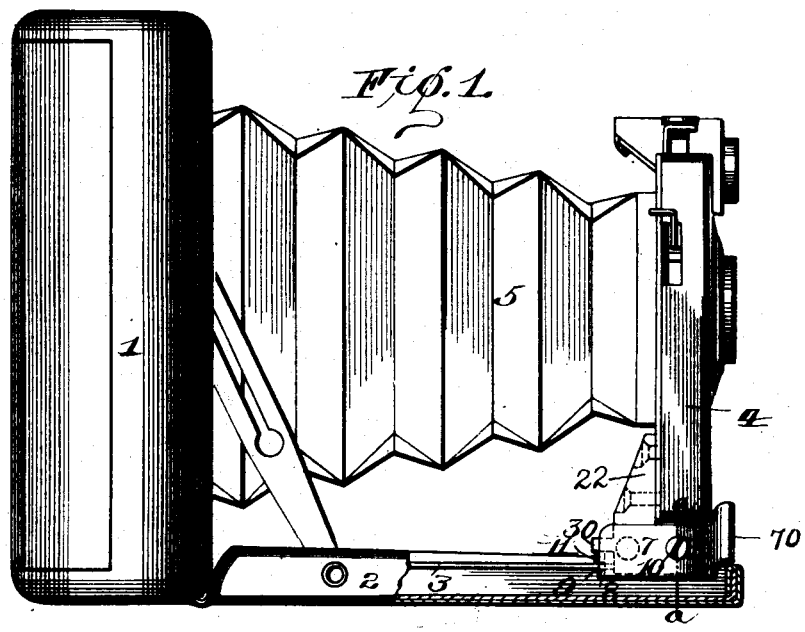
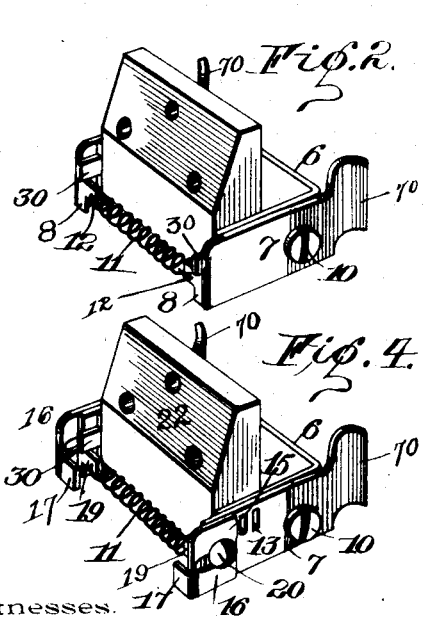
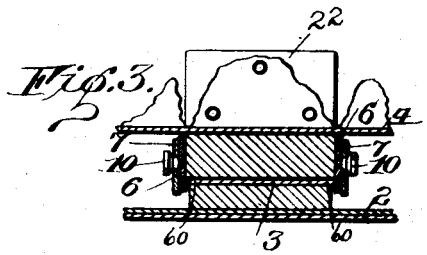
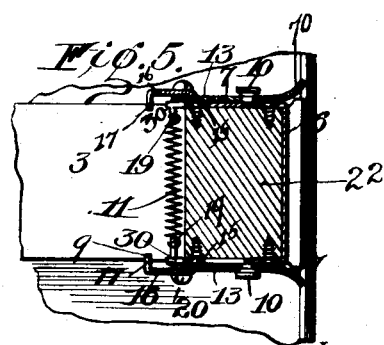
Witnesses. Inventor.

UNITED STATES PATENT OFFICE.

FRANK A. BROWNELL, OF ROCHESTER, NEW YORK, ASSIGNOR TO EASTMAN KODAK COMPANY, OF SAME PLACE.

FOCUSING DEVICE FOR PHOTOGRAPHIC CAMERAS.

SPECIFICATION forming part of Letters Patent No. 684,348, dated October 8, 1901.

Original application filed August 24, 1899, Serial No. 728,275. Divided and this application filed February 7, 1901. Serial No. 46,323. (No model.)

*To all whom it may concern:*

Be it known that I, FRANK A. BROWNELL, of Rochester, in the county of Monroe and State of New York, have invented certain new and useful Improvements in Focusing Devices for Photographic Cameras; and I do hereby declare the following to be a full, clear, and exact description of the same, reference being had to the accompanying drawings, forming a part of this specification, and to the reference-numerals marked thereon.

My present invention relates to focusing or adjusting devices for cameras—such, for instance, as that shown in my application, Serial No. 728,275, filed August 24, 1899—of which this application is a division, said devices being simple and cheap in construction and providing a means capable of application to cameras of any desired type to provide the necessary adjustments for focusing or extending and securing relatively movable parts—as, for instance, the front or lens-support and the rear or support for the focusing-screen or sensitized surface; and, further, it consists in certain devices and combination of parts, all as will be hereinafter described, the novel features being pointed out in the claims at the end of this specification.

In the drawings, Figure 1 is a side elevation of a camera, showing my improvement applied thereto; Fig. 2, a perspective view of the adjusting and holding device detached; Fig. 3, a vertical sectional view on the line *a a* of Fig. 1; Fig. 4, a perspective view of a modified form of the device, and Fig. 5 a horizontal sectional view of the same.

Similar reference-numerals in the several figures indicate similar parts.

The camera to which my invention is shown applied consists of a body 1, having a movable support 2, provided with a way or track plate 3, 4 indicating the camera-front, connected by the bellows 5 with the main frame or body of the camera and constituting the movable part between which and the way-plate 3 the adjusting and operating device forming the subject-matter of my present invention is applied.

For the purpose of this application we assume that the camera is one of the class known as "fixed-focus" cameras, in which the movable camera-front or lens-support 4 is drawn to its extreme outward position when in use and is secured to the way-plate 3, the latter being provided with notches or recesses, with which the holding device engages when moved to this point. The camera-front or lens-support 4 in the present embodiment is provided with a foot piece or block 22, to the sides of which is preferably attached a metal casing or bracket 6, having grooves 60 in its lower edges to receive the edges of the way-plate 3, although it will be readily understood that the plate 6 might be otherwise attached to the front 4 and the block which this plate surrounds dispensed with. Arranged upon the sides of the plate or bracket 6 are catch plates or levers 7, having their forward ends 70 bent outwardly or diverging slightly, as shown, to form engaging or operating portions and at their rear ends having lugs or catches 8 extending inwardly and adapted to engage the notches 9, formed in the way-plate 3. These catch-levers are loosely mounted upon screws or studs 10, entering the bracket 6, permitting the separation of their inner or rear ends, which are normally drawn into engagement with the sides of the way-plate by a single spring 11, connecting the ears or lugs 12, formed on the levers, said ears preferably extending below lugs 30 on the bracket 6, as shown in Figs. 2 and 5. By curving the catch-levers as shown, causing their flat sides to bear against the bracket 6, the parts may be readily constructed of sheet metal and secured in place by the two screws or studs mentioned, and the forward extensions 70 of the catch-plates serve as handles not only for releasing the catches, but for manipulating the lens-support or adjustable member 4 as well.

In employing devices of this description in cameras having a single lens and of fixed focus the necessary adjustment of focus may be readily accomplished by adjusting the lens in its mounting in the front 4; but where doubles lenses are employed and the camera-frame is to be moved to a certain definite position each time it is drawn out and secured by the engagement of the catches with the way-plate it is advisable to permit slight variations of the relation between the catches and the notches formed in the way-plate before the camera is sent out, and this I accomplish by making the catch-plate in two parts, one forming the main body of the lever, which is mounted in a definite position relative to the bracket 6, and the other the engaging portion adjustable thereon. A simple means of accomplishing this is shown in Figs. 4 and 5, in which the catch-levers are provided with a series of serrations, recesses, or notches 13, adapted to receive the tongues or lugs 15, formed upon the pieces or extension 16, carrying the lugs or shoulders 17 for engaging the notches in the way-plate 3 and also the lugs 19, to which the ends of the spring are attached, the levers and plates 15 being connected by screws 20. In this arrangement the operator when adjusting or testing the lens moves the support to the proper position, then engages the extension 15 with the notches in the way-plate, and secures said extensions to the catch-lever by means of the screw.

The various parts of the attachment or device are readily constructed of sheet material and may be assembled by an unskilled operator and various methods of construction may be devised by those skilled in the art without departing from the spirit of my invention.

I claim as my invention—

1. In a photographic camera, the combination with a way, and a support movable thereon, of a curved catch-plate pivoted on the side of the bracket having the inner engaging end and the outer operating end, and a spring for operating the catch into engagement with the way.

2. In a camera, the combination with a way, a support movable thereon, of the two curved catch-plates pivoted on the sides of the bracket having the outer operating ends and the inner ends engaging the way, and a spring for operating the engaging ends toward the way to grasp it between them.

3. In a camera, the combination with a way, and a support movable thereon, of the two curved catch-plates arranged on opposite sides of the bracket having the diverging operating ends and the opposite ends adapted to engage the way, the headed stud 10 passing through the plates and the spring for drawing the plates into engagement with the way.

4. The combination with the notched way and the bracket movable thereon, of the curved spring-operated catch-plates pivoted on the sides of the bracket having the relatively adjustable engaging portions coöperating with the way-plate.

5. In a camera, the combination with the bellows, the movable camera-front connected thereto, a supporting-bracket for the front, and a way on which it is movable, of the pivoted spring-operated catch-plates mounted on the bracket and adapted to engage the way and having the operating portions by means of which the catches can be disengaged and the camera-front adjusted.

6. In a camera, the combination with the bellows, a support having a notched way thereon, a bracket movable on the way and a lens-carrier on the bracket and attached to the bellows, of the two curved catch-plates pivoted on the sides of the bracket having the inner ends adapted to engage the way and the outer operating ends, and the spring connecting the inner ends of the catches whereby the operator may release the catches from the way and move the bracket by grasping the outer ends of the catches.

7. In a camera, the combination with the notched way-plate, of the lens-support movable thereon, the clamping-arms pivoted on the support having the extension-plates adjustably connected thereto and adapted to engage the notch in the way-plate.

8. In a camera, the combination with the notched way-plate, of the lens-support movable thereon, the curved clamping-arms pivoted on the sides of the support and the plates adjustably secured to the ends of the clamping-arms and having the lugs engaging the notched way-plate.

FRANK A. BROWNELL.

Witnesses:
 JOHN E. LENAHAN,
 F. F. CHURCH.